US010723333B2

(12) United States Patent
Yamakawa (10) Patent No.: US 10,723,333 B2
(45) Date of Patent: Jul. 28, 2020

(54) BRAKE FLUID PRESSURE CONTROL DEVICE FOR VEHICLE

(71) Applicant: NISSIN KOGYO CO., LTD., Tomi, Nagano (JP)

(72) Inventor: Teruyoshi Yamakawa, Tomi (JP)

(73) Assignee: NISSIN KOGYO CO., LTD., Tomi (JP)

( * ) Notice: Subject to any disclaimer, the term of this patent is extended or adjusted under 35 U.S.C. 154(b) by 0 days.

(21) Appl. No.: 16/093,161

(22) PCT Filed: Feb. 28, 2017

(86) PCT No.: PCT/JP2017/007929
§ 371 (c)(1),
(2) Date: Oct. 12, 2018

(87) PCT Pub. No.: WO2017/183318
PCT Pub. Date: Oct. 26, 2017

(65) Prior Publication Data
US 2019/0126896 A1 May 2, 2019

(30) Foreign Application Priority Data
Apr. 22, 2016 (JP) .................................. 2016-086095

(51) Int. Cl.
*G01M 17/02* (2006.01)
*B60T 8/1763* (2006.01)
(Continued)

(52) U.S. Cl.
CPC ............ *B60T 8/1763* (2013.01); *B60T 8/172* (2013.01); *B60T 13/686* (2013.01)

(58) Field of Classification Search
CPC .... B60W 30/02; B60W 30/143; B60W 40/06; B60W 40/068; B60T 13/636;
(Continued)

(56) References Cited

U.S. PATENT DOCUMENTS 5,719,565 A    2/1998   Tsuno et al.
6,202,020 B1 *  3/2001   Kyrtsos ................... B60T 8/172
                                                    701/37
(Continued)

FOREIGN PATENT DOCUMENTS

DE    4116269 A1    11/1991
JP    H04-24155     1/1992
(Continued)

OTHER PUBLICATIONS

International Search Report, dated May 30, 2017 (May 30, 2017), 2 pages.
(Continued)

*Primary Examiner* — Christopher P Schwartz
(74) *Attorney, Agent, or Firm* — Rankin, Hill & Clark LLP (57) ABSTRACT

A brake fluid pressure control device for a includes a wheel speed acquisition device that acquires a wheel speed, a slippage amount calculation device that calculates a wheel slippage amount, and a bad road determination device that determines whether a road surface of travel is a bad road. The bad road determination device determines whether the road surface of travel is a bad road using a bad road determination threshold value, and a value that relates to wheel behavior that is calculated based at least upon the wheel speed. The bad road determination threshold value is modified according to the wheel slippage amount. The present invention can appropriately set a bad road determination threshold value that is in accordance with a slippage amount, which corresponds to braking power, and can improve bad road determination precision without depending on variation in change of wheel speed.

2 Claims, 5 Drawing Sheets (51) Int. Cl.
*B60T 8/172* (2006.01)
*B60T 13/68* (2006.01)

(58) Field of Classification Search
CPC .......... B60T 8/172; B60T 8/173; B60T 8/176;
B60T 8/1761; B60T 8/1763; B60T
17/016; G01M 17/02; G01M 17/025
USPC .......... 303/150, 155, 191; 701/73, 74, 75, 80
See application file for complete search history.

(56) References Cited

U.S. PATENT DOCUMENTS

| | | | |
|---|---|---|---|
| 7,278,316 | B2 | 10/2007 | Satou et al. |
| 2005/0085987 | A1 | 4/2005 | Yokota et al. |
| 2006/0136111 | A1 | 6/2006 | Robert et al. |
| 2019/0120721 | A1* | 4/2019 | Suzuki ................... G07C 5/08 |
| 2019/0126897 | A1* | 5/2019 | Yamakawa ........... B60T 13/686 |

FOREIGN PATENT DOCUMENTS

| | | |
|---|---|---|
| JP | H4-24155 A | 1/1992 |
| JP | H11-78840 | 3/1999 |
| JP | H11-78840 A | 3/1999 |
| JP | H11-170999 | 6/1999 |
| JP | 2928890 | 8/1999 |
| JP | 2011-121376 | 6/2011 |
| JP | 2011-121376 A | 6/2011 |
| WO | 97/08029 A1 | 3/1997 |

OTHER PUBLICATIONS

Japanese Office Action with English translation dated Aug. 6, 2019, 6 pages.
Australian First Examination Report dated Mar. 20, 2019, 6 pages
European Search Report dated Nov. 20, 2019, 7 pages.

* cited by examiner

BRAKE FLUID PRESSURE CONTROL DEVICE FOR VEHICLE

TECHNICAL FIELD

The present invention relates to a brake fluid pressure control device for a vehicle that determines whether the state of a traveling road surface is bad.

BACKGROUND ART

An anti-lock brake system (ABS) is a device that prevents wheels from being locked. There is a known technique, disclosed in, for example, PTL 1, that determines whether the state (concavo-convex road surface) of a traveling road surface is bad in, for example, a motorcycle.

The technique in PTL 1 determines that the road state is bad when the number of times the wheel acceleration becomes equal to or more than a predetermined level (L1) is equal to or more than a predetermined number (KN1).

By the way, change of wheel speed during travel on a bad road is likely to vary depending on the magnitude of a braking power. However, since determination conditions are constant in the technique in PTL 1, further improvement of determination precision has been desired.

CITATION LIST

Patent Literature

PTL 1: Japanese Patent No. 2928890

SUMMARY OF INVENTION

Technical Problem

An object of the invention is to provide a brake fluid pressure control device for a vehicle capable of improving the precision of bad road determination.

Solution to Problem

According to a first aspect of the invention, there is provided a brake fluid pressure control device for a vehicle capable of performing fluid pressure control of a brake fluid pressure applied to a wheel brake, the brake fluid pressure control device including wheel speed acquisition means that acquires a wheel speed; slippage amount calculation means that calculates a slippage amount of a wheel; and bad road determination means that determines whether a state of a traveling road surface is bad, in which the bad road determination means determines whether the state of the traveling road surface is bad using a value related to wheel behavior calculated based on at least the wheel speed and a bad road determination threshold value and changes the bad road determination threshold value according to the slippage amount of the wheel.

According to a second aspect of the invention, in the brake fluid pressure control device for a vehicle according to the first aspect, the bad road determination threshold value when the slippage amount of the wheel is large is changed to a value larger than the bad road determination threshold value when the slippage amount of the wheel is small.

According to a third aspect of the invention, in the brake fluid pressure control device for a vehicle according to the first or second aspect, the value related to wheel behavior is a deviation between an estimated vehicle body speed and the wheel speed.

Advantageous Effects of Invention

The first aspect of the invention includes the wheel speed acquisition means, the slippage amount calculation means, and the bad road determination means, and the bad road determination means determines whether the state of the traveling road surface is bad using a value related to wheel behavior calculated based on at least the wheel speed and the bad road determination threshold value and changes the bad road determination threshold value according to the slippage amount of the wheel. This structure can appropriately set the bad road determination threshold value according to the slippage amount corresponding to the braking power and can improve the precision of bad road determination.

In the second aspect of the invention, when, for example, the braking power is large, a so-called lift-up amount and low-down amount also become large. Accordingly, bad road determination can be performed with better precision by setting the bad road determination threshold value when the slippage amount of the wheel is large to a value larger than the bad road determination threshold value when the slippage amount of the wheel is small.

In the third aspect of the invention, by using the deviation between the estimated vehicle body speed and the wheel speed as the value related to wheel behavior, it is possible to detect reduction in gripping strength of a tire with respect to the traveling road surface or a return tendency and noise in an output value of a wheel speed sensor, which are phenomena particular to bad roads, thereby enabling more accurate bad road determination. This improves the precision of bad road determination and fluid pressure control such as ABS.

DESCRIPTION OF EMBODIMENTS

An embodiment of the invention will be described below with reference to the attached drawings.

Example

Figure 1:
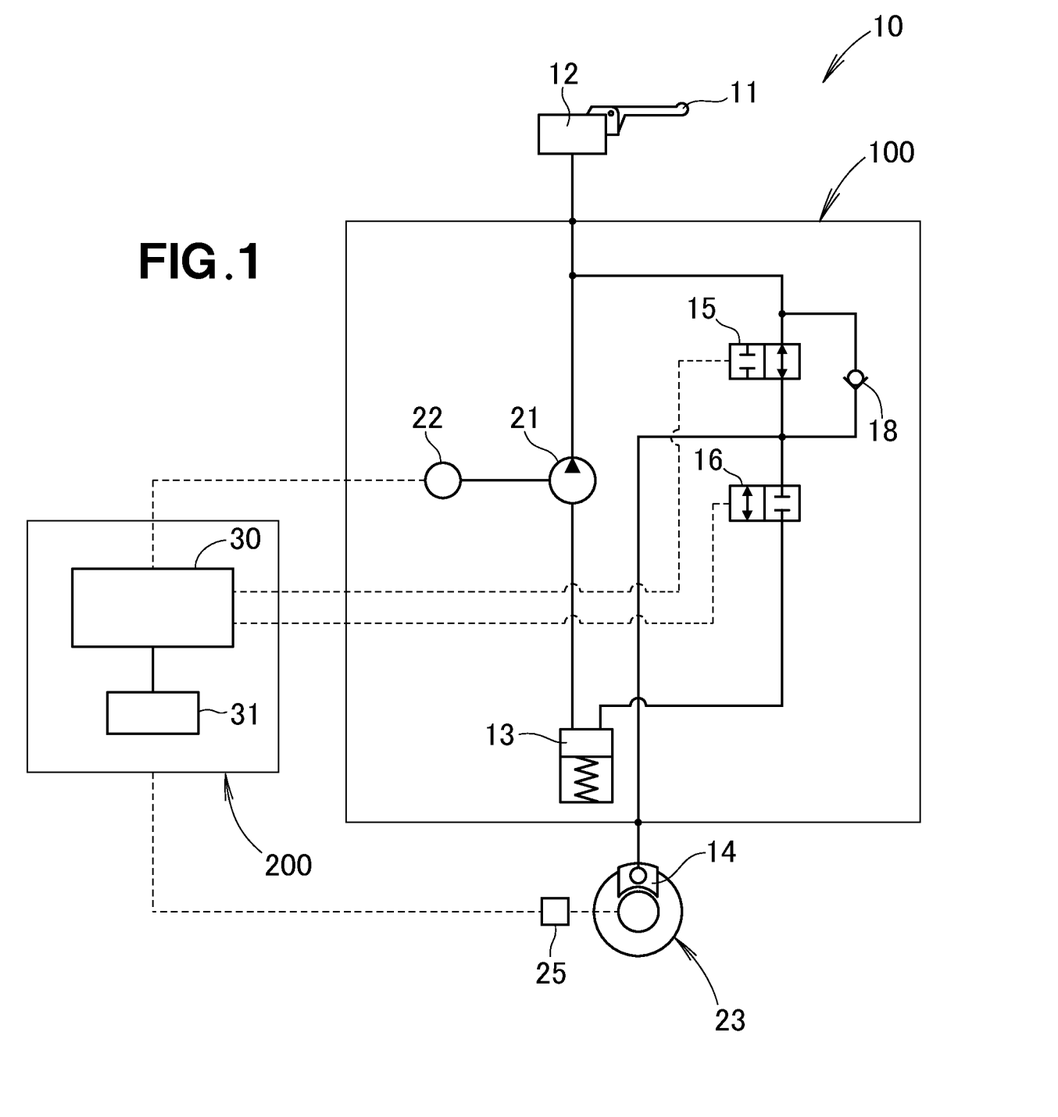
FIG. 1 is a fluid pressure circuit diagram illustrating the brake fluid pressure control device for a vehicle according to the invention.

As illustrated in FIG. 1, a brake fluid pressure control device 10 for a vehicle appropriately controls a braking force (brake fluid pressure) to be applied to a wheel of a vehicle. In this example, the brake fluid pressure control device 10 is installed in a bar handle vehicle and applied to, for example, the front wheel of a motorcycle.

The brake fluid pressure control device 10 for a vehicle mainly includes a fluid pressure unit 100 in which fluid lines (brake fluid lines) and various components are provided and a control device 200 that controls the various components in the fluid pressure unit 100. The fluid pressure unit 100 is disposed between a master cylinder 12, which is a fluid pressure source, and a wheel brake 14.

The fluid pressure unit 100 has an inlet control valve 15 (control valve means 15), which is a normally open solenoid valve, and an outlet control valve 16 (control valve means 16), which is a normally closed solenoid valve, provided in the fluid pressure line from the master cylinder 12 to the wheel brake 14, a reservoir 13 in which operating fluid is stored temporarily, a check valve 18 that is provided in parallel to the inlet control valve 15 and allows a flow only to the master cylinder 12, a pump section 21 capable of discharging the operating fluid stored in the reservoir 13 to the master cylinder 12, and an actuator (motor) 22 that drives this pump section 21. The control device 200 includes a controller 30 that controls the driving of the actuator 22 and controls the opening and closing of the inlet control valve 15 and the outlet control valve 16 and a determining section 31 that determines whether the state of the traveling road surface is bad.

A wheel speed sensor 25 that detects the wheel speed of a wheel 23 is connected to the control device 200. The wheel speed is acquired by the determining section 31 and the estimated vehicle body speed is calculated based on the wheel speed. The signal of bad road determination and the signals of the wheel speed and the estimated vehicle body speed by the determining section 31 are transmitted to the controller 30 and the controller 30 performs ABS control and the like according to a bad road. Accordingly, control such as ABS control can be improved.

First, the basic operation during normal braking and the basic operation during ABS control will be described. The brake fluid pressure control device 10 for a vehicle has the function of switching among a normal state during normal braking, a reduced pressure state during ABS control, a holding state during ABS control, and an increased pressure state during ABS control.

During normal braking: In the normal state (that is, current is not supplied to the inlet control valve 15 and the outlet control valve 16), the master cylinder 12 and the wheel brake 14 are communicated with each other (the inlet control valve 15 is opened) and communication between the wheel brake 14 and the reservoir 13 is interrupted (the outlet control valve 16 is closed). When an operating member 11 is operated, an operating fluid pressure from the master cylinder 12 is applied to the wheel brake 14 via the inlet control valve 15 and the wheel is braked.

During ABS control: When the wheel is almost locked, the control device 200 makes ABS control by performing switching among the reduced pressure state, the holding state, and the increased pressure state.

In the reduced pressure state during ABS control, current is fed to the inlet control valve 15 and the outlet control valve 16 to interrupt communication between the master cylinder 12 and the wheel brake 14 (close the inlet control valve 15) and communicate the wheel brake 14 and the reservoir 13 with each other (open the outlet control valve 16). The operating fluid leading to the wheel brake 14 is released to the reservoir 13 via the outlet control valve 16 to reduce the operating fluid pressure applied to the wheel brake 14.

In the holding state during ABS control, current is fed only to the inlet control valve 15 to interrupt communication between the master cylinder 12 and the wheel brake 14 and communication between the wheel brake 14 and the reservoir 13 (close the inlet control valve 15 and the outlet control valve 16). The operating fluid is confined within the flow path formed by the wheel brake 14, the inlet control valve 15, and the outlet control valve 16 to hold the operating fluid pressure applied to the wheel brake constant.

In the increased pressure state during ABS control, supply of current to the inlet control valve 15 and the outlet control valve 16 is stopped to communicate the master cylinder 12 and the wheel brake 14 with each other (open the inlet control valve 15) and interrupt communication between the wheel brake 14 and the reservoir 13 (close the outlet control valve 16).

This causes the operating fluid pressure from the master cylinder 12 to increase the fluid pressure of the wheel brake 14. In addition, during ABS control, the control device 200 drives the actuator 22 to operate the pump section 21. This causes the operating fluid temporarily stored in the reservoir 13 to return to the master cylinder 12.

As described above, the brake fluid pressure control device 10 for a vehicle enables fluid pressure control of the brake fluid pressure applied to the wheel brake 14 by repeating a control cycle including the reduced pressure state, the holding state, and the increased pressure state.

Figure 2:
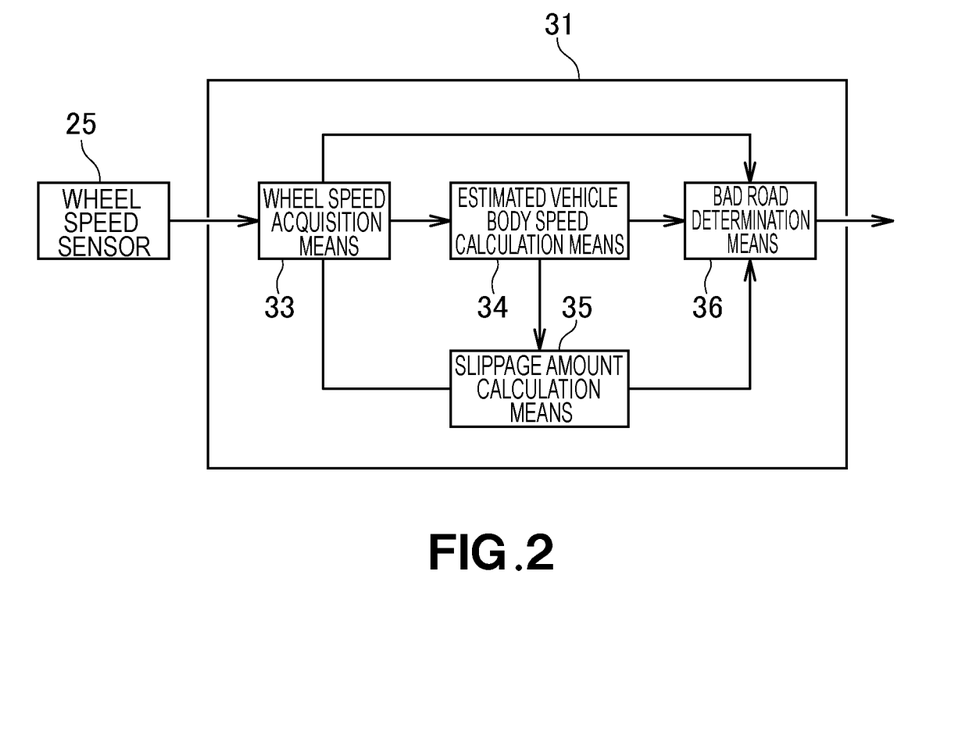
FIG. 2 is a block diagram illustrating the structure of a determining section.

Next, the structure of the determining section 31 will be described.

As illustrated in FIG. 2, the determining section 31 includes wheel speed acquisition means 33 that acquires a wheel speed VW detected by the wheel speed sensor 25, estimated vehicle body speed calculation means 34 that calculates an estimated vehicle body speed VR based on the wheel speed VW acquired by the wheel speed acquisition means 33, slippage amount calculation means 35 that calculates a slippage amount SR of the wheel, and bad road determination means 36 that determines whether the state of the traveling road surface is bad. It should be noted here that the present example uses the value obtained by subtracting the wheel speed VW from the estimated vehicle body speed VR as the slippage amount SR, but the invention is not limited to the example and the value represented by (VR−VW)/VR may be used as the slippage amount SR.

Here, the state of a vehicle body during travel on a bad road will be simply described. During travel on a bad road (for example, a concavo-convex road), a change in the wheel speed due to a slip of the wheel 23 and recovery of rotation is easily caused by a change in a wheel gripping strength and a wheel contact load. On a concavo-convex bad road, a slip is likely to occur because the wheel contact load is instantaneously reduced in recessed portions of the road surface and rotation is likely to recover because the wheel makes contact with the ground surface in convex portions of the road surface.

For example, a so-called overshoot (a value that is not detected on a good road, such as noise) is likely to occur in the wheel speed as the contact load increases when contact with a convex portion is made and the overshoot immediately recovers. Accordingly, the wheel speed is likely to become larger than the vehicle body speed. Accordingly, the wheel speed changes by instantaneously becoming larger (higher) than or smaller (lower) than the vehicle body speed.

Figure 3:
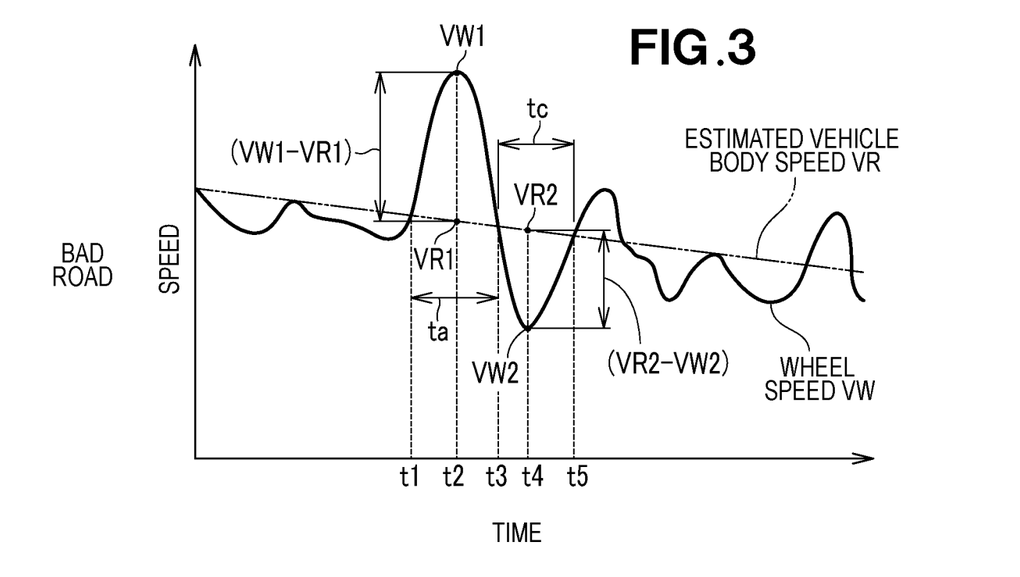
FIG. 3 is a correlation diagram of a time and a speed for a bad road.

Next, processing by the bad road determination means 36 will be described with reference to FIG. 3 and FIG. 4.

First, when the wheel speed VW exceeds (also referred to below as a lift-up) the estimated vehicle body speed VR (time t1), the bad road determination means 36 starts measuring a lift-up time ta. It should be noted here that the solid line in FIG. 3 indicates the wheel speed VW and the imaginary line indicates the estimated vehicle body speed VR. In addition, the bad road determination means 36 obtains a lift-up peak amount (VW1−VR1 at time t2) as an example of the deviation by monitoring the lift-up amount.

Then, when the lift-up state is released (time t3), bad road determination is performed based on the lift-up time ta and the lift-up peak amount. Specifically, the bad road determination threshold value TH is acquired based on the lift-up time ta and a map MP illustrated in FIG. 4 and the lift-up peak amount is compared with the bad road determination threshold value TH.

Figure 4:
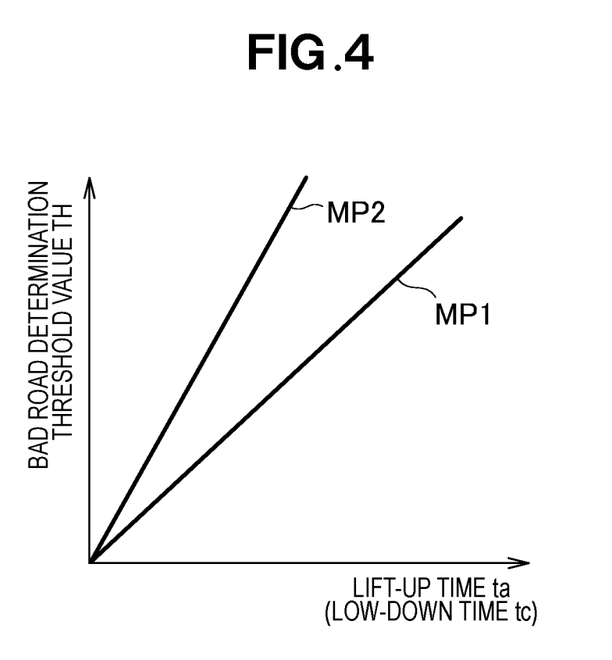
FIG. 4 is a map illustrating the relationship between a lift-up time and a bad road determination threshold value TH.

FIG. 4 is a map illustrating the relationship between the lift-up time and the bad road determination threshold value TH, and the bad road determination threshold value TH becomes larger as the lift-up time is larger (longer). A plurality of such maps is set based on the magnitude of the slippage amount. In the example in FIG. 4, a map MP1 selected when the slippage amount is equal to or less than a predetermined value P and a map MP2 selected when the slippage amount is more than the predetermined value P are set.

In this example, these maps are set so that the bad road determination threshold value TH of the map MP2 is larger than the bad road determination threshold value TH of the map MP1. The predetermined value P is set by, for example, experiment, simulation, or the like. Selection of the map MP will be described in detail below.

When the lift-up peak amount is more than the bad road determination threshold value TH, the bad road determination means 36 determines that the state of the traveling road surface is bad.

It should be noted here that the state in which the wheel speed VW is less than the estimated vehicle body speed VR (also referred to below as low-down) is also subject to bad road determination as in the lift-up state. When the low-down state occurs (time t3), the bad road determination means 36 measures a low-down time tc. In addition, the bad road determination means 36 obtains the low-down peak amount (VR2−VW2 at time t4) as an example of the deviation by monitoring a low-down amount.

Then, when the low-down state is released (t5), bad road determination is performed based on the low-down time tc and the low-down peak amount. Specifically, the bad road determination threshold value TH is acquired based on the low-down time tc and the map MP illustrated in FIG. 4 and the low-down peak amount is compared with the bad road determination threshold value TH. When the low-down peak amount is more than the bad road determination threshold value TH, the bad road determination means 36 determines that the state of the traveling road surface is bad.

Next, a processing flow of bad road determination performed by the above brake fluid pressure control device for a vehicle during ABS control will be described.

Figure 5:
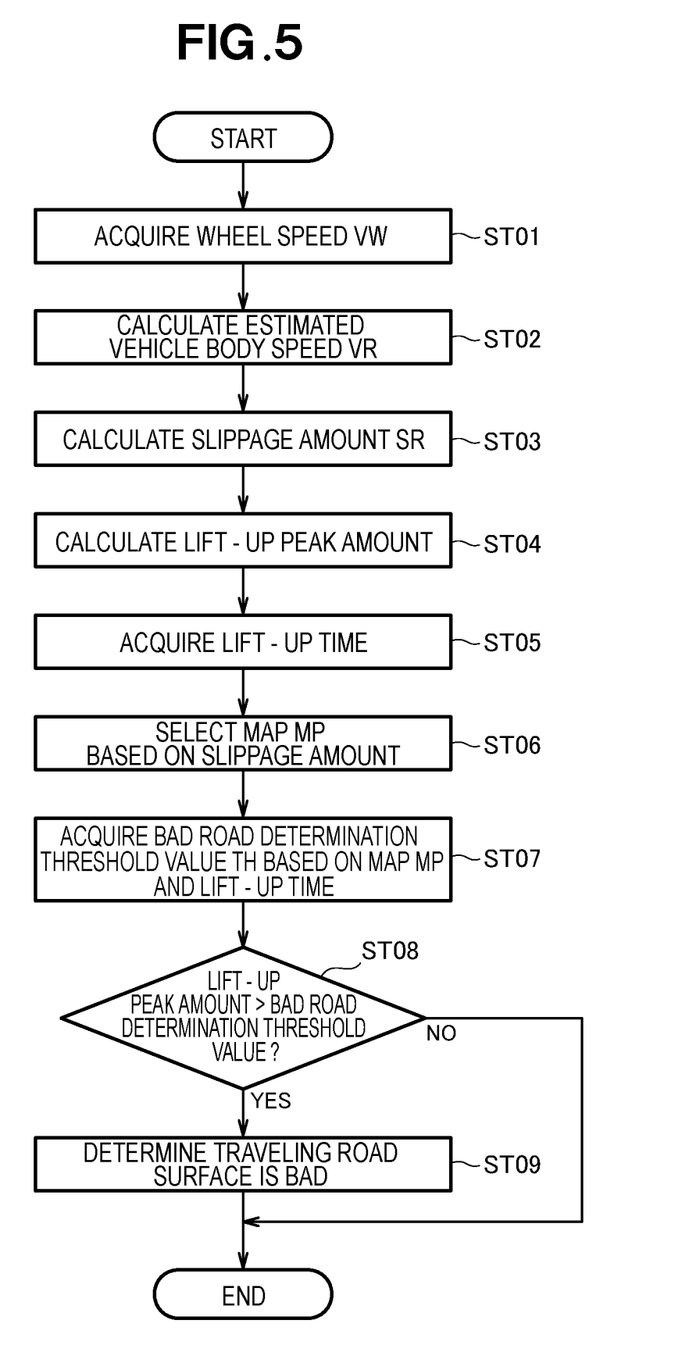
FIG. 5 is a flowchart for bad road determination.

As illustrated in FIG. 5, during ABS control, the wheel speed acquisition means 33 first acquires the wheel speed VW from the wheel speed sensor 25 in step (referred to below as ST) 01.

In ST02, the estimated vehicle body speed calculation means 34 calculates the estimated vehicle body speed VR based on the wheel speed VW.

In ST03, the slippage amount calculation means 35 calculates the slippage amount SR based on the wheel speed VW and the estimated vehicle body speed VR.

In ST04, the bad road determination means 36 calculates the lift-up peak amount (low-down peak amount) by monitoring the lift-up amount (low-down amount). In ST05, the bad road determination means 36 acquires the lift-up time (low-down time). Although an example of the lift-up state is described for the sake of convenience here, similar processing can be applied during low-down and, in this case, use of the parenthesized parameters is only required (this is also true hereinafter).

In ST06, the bad road determination means 36 selects the map MP based on the slippage amount SR. The processing in ST06 will be described with reference to FIG. 6.

Figure 6:
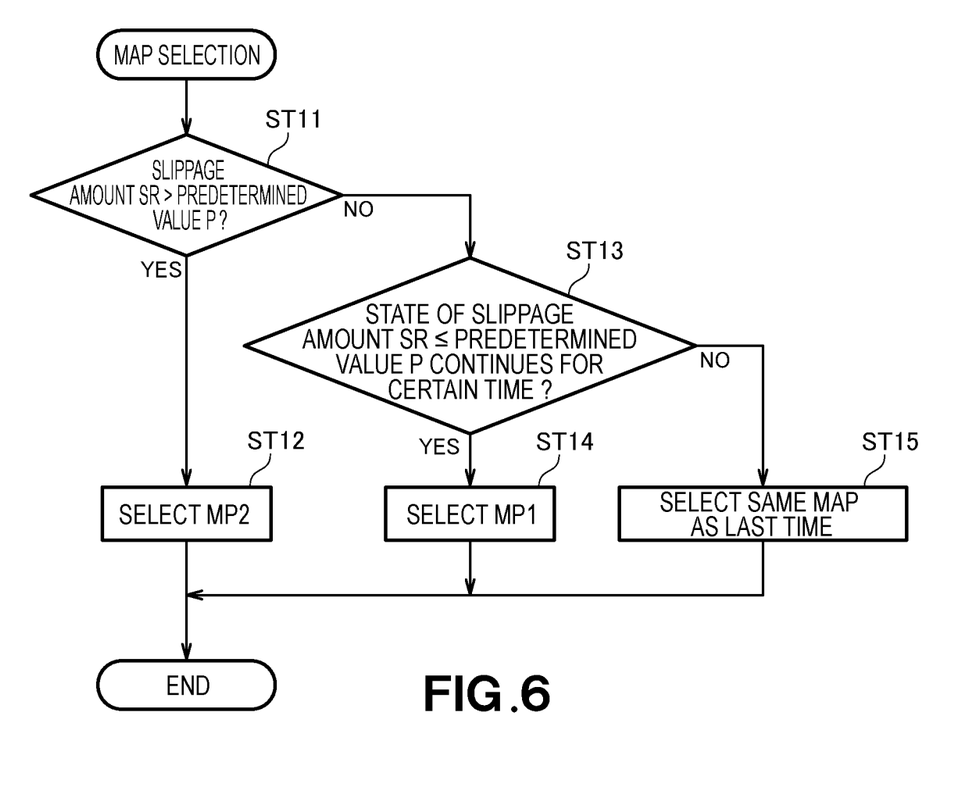
FIG. 6 is a flowchart illustrating processing in ST06.

As illustrated in FIG. 6, the bad road determination means 36 starts map selection processing in ST06. The bad road determination means 36 determines whether the slippage amount SR is more than the predetermined value P in ST11 and, when the slippage amount SR is more than the predetermined value P (YES in ST11), selects the map MP2 (ST12), and returns to the processing in FIG. 5.

In contrast, when the slippage amount SR is not more than the predetermined value P (that is, the slippage amount SR is equal to or less than the predetermined value P) (NO in ST11), the bad road determination means 36 determines whether the state in which the slippage amount SR is equal to or less than the predetermined value P continues for a certain time or more (ST13).

When the state in which the slippage amount SR is equal to or less than the predetermined value P continues for the certain time or more (YES in ST13), the bad road determination means 36 selects the map MP1 (ST14) and returns to the processing in FIG. 5.

In contrast, when the state in which the slippage amount SR is equal to or less than the predetermined value P does not continue for the certain time or more (NO in ST13), the bad road determination means 36 selects the same map selected last time (ST15) and returns to the processing in FIG. 5.

As described above, when the slippage amount SR of the wheel is more than the predetermined value P, the bad road determination threshold value is changed to a value larger than in the case where the slippage amount SR is equal to or less than the predetermined value P. This can detect the state in which the braking power (slippage amount) is large and change the bad road determination threshold value to an appropriate value by setting the predetermined value P through, for example, experiment, simulation, or the like in advance.

In contrast, the bad road determination threshold value is changed to a value that makes a determination as a bad road easier as the slippage amount SR of the wheel is smaller. Since this changes the bad road determination threshold value to a value that makes a determination as a bad road easier as the slippage amount corresponding to the braking power is smaller even when, for example, an input from the brake operating member is small and the braking power is small, bad road determination can be performed with better precision.

In addition, when the time period for which the slippage amount SR of the wheel is equal to or less than the predetermined value P continues for a certain time, the bad road determination threshold value is changed to a value smaller than in the case where the slippage amount SR is more than the predetermined value P. It is possible to restore the bad road determination threshold value corresponding to the small braking power (slippage amount SR) at an appropriate timing. In addition, it is possible to prepare for a continuous bad road by appropriately switching the bad road determination threshold value between the large value and the small value.

If such processing is performed, even when, for example, the slippage amount becomes larger than the predetermined value P, the map MP2 is selected, and then the slippage amount becomes equal to or less than the predetermined value P, the map MP2 remains selected until a certain time elapses and then the map MP1 is selected after the state in which the slippage amount is equal to or less than the predetermined value P continues for a certain time.

Returning to the processing in FIG. 5, the bad road determination means 36 acquires the bad road determination threshold value TH based on the selected map MP and the lift-up time (low-down time) in ST07.

In ST08, the bad road determination means 36 determines whether the lift-up peak amount (low-down peak amount) is more than the bad road determination threshold value TH. When the lift-up peak amount (low-down peak amount) is more than the bad road determination threshold value TH, the bad road determination means 36 determines that the state of the traveling road surface is bad (ST09). When the lift-up peak amount (low-down peak amount) is not more than the bad road determination threshold value TH, the processing ends.

As described above, the bad road determination means 36 determines whether the state of the traveling road surface is bad based on the deviation (VW1−VR1) or (VR2−VW2) between the estimated vehicle body speed VR and the wheel speed VW. When the deviation (VW1−VR1) or (VR2−VW2) is more than the bad road determination threshold value TH, the bad road determination means 36 determines that the state of the traveling road surface is bad.

The brake fluid pressure control device 10 for a vehicle includes the wheel speed acquisition means 33, the slippage amount calculation means 35, and the bad road determination means 36, and the bad road determination means 36 determines whether the state of the traveling road surface is bad using the value related to wheel behavior calculated based on at least the wheel speed VW and the bad road determination threshold value TH and changes the bad road determination threshold value TH according to the slippage amount of the wheel. This structure can appropriately set the bad road determination threshold value TH according to the slippage amount corresponding to the braking power and can improve the precision of bad road determination.

In addition, when, for example, the braking power is large, a so-called lift-up amount and low-down amount also become large. Accordingly, bad road determination can be performed with better precision by setting the bad road determination threshold value TH when the slippage amount SR of the wheel 23 is large to a value larger than the bad road determination threshold value TH when the slippage amount SR of the wheel is small.

In addition, the bad road determination means 36 determines whether the state of the traveling road surface is bad based on the deviation (VW1−VR1) or (VR2−VW2) between the estimated vehicle body speed VR and the wheel speed VW. By using the deviation (VW1−VR1) or (VR2−VW2) between the estimated vehicle body speed VR and the wheel speed VW as the value related to wheel behavior, it is possible to detect reduction in gripping strength of a tire with respect to the traveling road surface or a return tendency and noise in an output value of the wheel speed sensor 25, which are phenomena particular to bad roads, thereby enabling more accurate bad road determination. This improves the precision of bad road determination and improves fluid pressure control such as ABS.

Although the brake fluid pressure control device for a vehicle is provided only for the front wheel in the example, the wheel brake fluid pressure control device may be provided only for the rear wheel or may be provided for the front and rear wheels.

In addition, although the controller 30 and the determining section 31 are provided as separate components in the example, the controller 30 and the determining section 31 may be integrated and their functions may be separated internally. In addition, although the operating member 11 is a brake lever in the example, the operating member 11 is not limited to a brake lever and may be a brake pedal.

In addition, although the actuator 22 is a motor and the motor and the pump section 21 constitute a pump 20 in the example, the invention is not limited to the example and the actuator 22 may be a solenoid and the pump 20 may be a solenoid pump including the solenoid and the pump section 21.

In addition, although the map MP1 and the map MP2 are used in the example, the invention is not limited to the example and three or more maps may be set in advance so that a map suited for the slippage amount can be selected from the three or more maps.

In addition, although the bad road determination threshold value TH is acquired using the map MP based on the lift-up time in the example, a relational expression such as a function may be used in place of the map.

INDUSTRIAL APPLICABILITY

The invention is preferable to a brake fluid pressure control device to be mounted in a motorcycle.

REFERENCE SIGNS LIST

10: brake fluid pressure control device for vehicle
14: wheel brake
23: wheel
30: controller
31: determining section
33: wheel speed acquisition means
34: estimated vehicle body speed calculation means
35: slippage amount calculation means
36: bad road determination means
50: bad road (traveling road surface)
VW: wheel speed
SR: slippage amount
V1 to V4, Va to Vd: bad road determination threshold value
Tf: certain time

The invention claimed is:

1. A brake fluid pressure control device for a vehicle capable of performing fluid pressure control of a brake fluid pressure applied to a wheel brake, the brake fluid pressure control device comprising:
   wheel speed acquisition means that acquires a wheel speed;
   slippage amount calculation means that calculates a slippage amount of a wheel; and
   bad road determination means that determines whether a state of a traveling road surface is bad,
   wherein the bad road determination means determines whether the state of the traveling road surface is bad based upon a value related to wheel behavior, said value related to wheel behavior being calculated based on at least the wheel speed and a bad road determination threshold value, and
   wherein the bad road determination means:
   changes the bad road determination threshold value according to the slippage amount of the wheel, and
   changes the bad road determination threshold value when the slippage amount of the wheel exceeds a predetermined value to a value larger than the bad road determination threshold value when the slippage amount is equal to or less than the predetermined value, and changes the bad road determination threshold value when the state in which the slip amount is equal to or less than the predetermined value continues for a predetermined time or more to a value smaller than the bad road determination threshold exceeding the predetermined value.

2. The brake fluid pressure control device for a vehicle according to claim 1, wherein the value related to wheel behavior is a deviation between an estimated vehicle body speed and the wheel speed.

\* \* \* \* \*